United States Patent [19]

Schwarzenbek

[11] 4,362,651

[45] Dec. 7, 1982

[54] HIGH POROSITY CATALYSTS

[76] Inventor: Eugene F. Schwarzenbek, 3 Seacrest Dr., Lavallette, N.J. 08735

[21] Appl. No.: 157,437

[22] Filed: Jun. 9, 1980

Related U.S. Application Data

[63] Continuation-in-part of Ser. No. 22,853, Mar. 22, 1979, abandoned.

[51] Int. Cl.³ .................. B01J 27/02; B01J 35/06; B01J 29/02; B01J 21/04
[52] U.S. Cl. ................... 252/440; 208/120; 208/216 PP; 252/432; 252/449; 252/455 R; 252/455 Z; 252/463; 252/465; 501/80
[58] Field of Search ............ 252/440, 455 Z, 457, 252/463, 477 R; 106/40 R

[56] References Cited

U.S. PATENT DOCUMENTS

| | | | |
|---|---|---|---|
| 3,162,607 | 12/1964 | Burbidge et al. | 252/477 |
| 3,822,340 | 7/1974 | Eberl et al. | 423/555 |
| 4,113,660 | 9/1978 | Abe et al. | 252/455 R |
| 4,126,579 | 11/1978 | Flaherty, Jr. et al. | 252/455 Z |
| 4,140,654 | 2/1979 | Yshioka et al. | 252/455 R |
| 4,152,408 | 5/1979 | Winslow | 423/555 |

*Primary Examiner*—P. E. Konopka

[57] ABSTRACT

The porosity of heterogeneous type catalysts is increased by incorporating during the preparation a short fibrous type material commonly referred to as a whisker. This type material is highly effective in increasing the volume and diameter of the pores in the catalyst.

13 Claims, No Drawings

HIGH POROSITY CATALYSTS

This application is a continuation-in-part of U.S. patent application Ser. No. 022,853, filed Mar. 22, 1979, and now abandoned.

BACKGROUND OF THE INVENTION

1. Field of Invention

The field of art to which the invention pertains is hydrocarbon, petrochemical, and chemical processing. In particular, this invention pertains to the catalysts used in certain heterogeneous catalytic processes in which the activity, selectivity characteristics, and life of the catalysts are improved by increasing the volume and diameter of the pores in the catalyst structure.

2. Description of the Prior Art

During the past 40 years there have been major advances in the catalytic conversion of one form of carbon containing molecule to another. This development has been particularly striking in the petroleum refining industry. In the early years petroleum fractions were, for example, reformed, cracked, or polymerized by thermal means under controlled conditions of temperature, pressure, and time. Today, the industry uses almost exclusively catalytic means to carry out the various transformations desired, the majority of the processes being of the heterogeneous catalytic type. In this type catalysis the reaction occurs on a solid inorganic surface in a series of steps as follows:

a. Mass transfer of the molecules from the flowing stream to the surface of the catalyst pellets.
b. Diffusion of the reactant molecules through the catalyst pores to the inner catalyst surface.
c. Reaction of the molecules on the inner surface.
d. Diffusion of the products of reaction from within the pellet, through the pores, and out to the outer surface of the pellet.
e. Mass transfer of the products of reaction from the outer pellet surface to the main flowing stream.

Items a and e, the mass transfers of feed and products between the flowing stream and the catalyst pellet have not been a serious problem, being usually controlled by proper engineering design of the reaction system, in particular the proper flowing velocity of the feed stream through the bed of catalyst pellets. In the past, most of the development work has been directed toward item c, the reaction on the inner surface. This work has been directed toward new catalyst formulations, increasing the active surface of the catalyst, and increasing the dispersion of metals which may be deposited on the surface to promote the catalytic reaction. It has been found, however, that in many reactions the type of internal surface is equally or more important than the amount of internal surface available. This has been the result of a greater understanding and appreciation of the role of items b and d, the diffusion of the feed and products within the catalyst pellet.

The most common type diffusion problem occurs when the reaction of the molecules at the catalyst surface is much more rapid than the rate of diffusion of the feed molecules through the pellet to the catalyst inner surface. Under these conditions the reaction occurs in the outer part of the catalyst pellet before the feed molecules have an opportunity to penetrate into the inner portion of the pellet. As a result the inner portion of the catalyst pellet is not being effectively used and the reaction rate is much less than one would theoretically expect. Under these conditions the reaction is commonly referred to as diffusion controlled.

There are two types of diffusion normally considered. One is Knudsen or molecular diffusion which occurs when the mean free path between intermolecular collisions is large compared to the pore diameter. The other is Bulk diffusion which occurs when the mean free path is small compared to the pore diameter. The Knudsen diffusion constant per unit cross-sectional area of the pore is given by:

$$D_k = \tfrac{2}{3}rv = 9.7 \times 10^3 r \frac{[T]^{0.5}}{[M]} \frac{cm^2}{sec}$$

where r is the pore radius in cm, v is the average molecular velocity in cm/sec, T is the temperature in °K., and M is the molecular weight. The Knudsen diffusion rate is directly proportional to the pore radius. The Bulk diffusion coefficient in a mixture of similar mass and molecular diameter is given by:

$$D_b = \tfrac{1}{3}vL$$

where v is the average molecular velocity and L is the mean free path in cm.

The combined Knudsen and Bulk diffusion coefficient in a given pore as recommended by A. Wheeler in "Catalysis" Vol 2, Reinhold, N.Y. 1955 is given by the formula:

$$D = D_b \left[ 1 - e^{-\frac{D_k}{D_b}} \right]$$

The coefficient $D_c$ within a catalyst granule is simply the coefficient for a single pore times the number of pores per unit surface of the pellet, which reduces to:

$$D_c = \tfrac{1}{2}\theta D$$

where $D_c$ is the overall diffusion coefficient within a porous catalyst pellet, $\theta$ is the porosity, and D is the diffusion coefficient for a single pore as given above. It is apparent from the above relationships that the catalyst physical characteristics which affect diffusion within a catalyst pellet or granule are the catalyst porosity and the catalyst pore radius.

Another factor which must be considered in the formulation of a catalyst is the role of poisons on catalyst performance. Of particular concern are those conditions where the poison molecules are deposited after a few collisions with the catalyst surface. In this situation the outer pore mouths become severely poisoned while the inner surface of the catalyst remains essentially clean. As the outer pore mouths become smaller in diameter with the deposition of poisons, it is possible that diffusion through the poisoned pore mouth can become a slow process which can become rate determining. In this type catalytic process, proper formulation of the catalyst is required to minimize the deleterious effect of this poisoning of the catalyst.

There are a number of present day processes in which the diffusion problem discussed above is a factor in the performance of the catalyst. P. B. Weisz and R. D. Goodwin discussed the combustion of carbonaceous deposits within porous catalyst particles in the Journal of Catalysis 2, 397–404 [1963]. In the regeneration of 0.20 cm catalyst beads from the commercial TCC cracking process, it was demonstrated that at high temperatures the outer shell of the bead could be free of carbon whereas the center of the bead could be still black with carbon. Under these conditions the reaction rate of the burning of coke with air was greater than the rate of diffusion of the air through the pores. As a result the oxygen as it entered the catalyst particle would be consumed by reaction with coke before it could diffuse to the center of the particle.

An example of catalyst deactivation through pore mouth plugging during petroleum residuum desulfurization was given by F. M. Dautzenberg et al of Shell Research in The Netherlands in Chemical Reaction Engineering—Houston, ACS Symposium Series #65. Dautzenberg et al showed that in the processing of petroleum residua over conventional desulfurization catalysts there is a gradual deposition of the metals originally present in the oil, principally nickel and vanadium, on the catalyst. These metals gradually plugged the pores in the outer zone of the catalyst. This causes a slow loss in desulfurization activity over a longer period of time. Ultimately, the catalyst becomes totally inactive for desulfurization because the still active inner core of the catalyst has become completely inaccessible to the sulfur bearing molecules.

The effect of catalyst pore size on performance in the desulfurization of petroleum residua was also reported by K. L. Riley of the Exxon Baton Rouge Laboratories in the Preprints of the Division of Petroleum Chemistry, American Chemical Society, Vol 23 No 3 August 1978. This work showed that the reaction rate for the removal of nickel and vanadium from the petroleum residua was increased two to three fold for a two fold increase in the pore diameter of the catalyst. The desulfurization activity also increased as the pore size was increased, though the activity started to decrease at the high pore size level.

It is apparent from the above that the role of pore dimensions has been receiving increased attention in respect to their affect on catalyst performance. As a result, a number of methods have been developed to control catalyst porosity. In one of these techniques pore dimensions are controlled by varying precipitation or gelation conditions and aging of the gel with respect to concentration, temperature, and gelation agents. Typical data for commercial grades of alumina so prepared are given in Table 1.

TABLE 1

| Commercial Grades of Alumina | | |
|---|---|---|
| Surface area sq.m./gr | Pore volume cc/gr | Pore diameter Angstrom |
| 350 | 0.43 | 49 |
| 245 | 0.60 | 98 |
| 200 | 0.77 | 154 |

It is typical of conventional catalyst preparation techniques that the surface area and intrinsic activity of the catalyst decrease as the pore diameter is increased. As illustrated in the R. L. Riley reference above on the desulfurization of petroleum residua, when the pore diameter is low, the catalyst loses its high intrinsic activity very rapidly as a result of pore mouth plugging due to both carbon and metal deposition in the outer shell of the catalyst. As the pore diameter is increased, this effect is decreased and improved activity is realized. At very high pore diameters, the pore mouth plugging problem may be greatly minimized, but the effect of the low surface area and low intrinsic activity is now realized and a loss in desulfurization activity starts to be observed.

Another technique of increasing pore volume and decreasing pore diffusion problems has been to add to the hydrous catalyst precipitate before drying a dry inert type material. This apparently has the effect of increasing the amount of large pores in the catalyst. Burbidge et al in U.S. Pat. No. 3,162,607, for example, added water insoluble organic fibers to an alumina gel and after drying the organic fibers were removed by calcination at an elevated temperature. This preparation technique gives an anticipated result in that it appears quite reasonable that the removal of the fiber by calcination, solvent extraction, or some other technique would leave voids in the space previously occupied by the fiber and result in increased porosity. Improved desulfurization performance was illustrated for catalysts using the alumina prepared by this technique to increase the amount of large pores.

It is apparent from the above that catalyst pore size plays an important role where diffusion limitations and/or pore plugging is encountered. Also, a number of techniques have been developed to increase catalyst pore size and decrease pore diffusion problems. In the practice of this invention catalyst of varying pore size can be prepared by incorporating in the catalyst structure a special additive material, which technique is more effective than other known methods in increasing pore size with a minimum loss in surface area and intrinsic catalyst activity, and without the necessity to remove the additive by any special extraction technique.

SUMMARY OF THE INVENTION

The invention claimed can be summarized as a method of increasing the porosity of catalytic materials by incorporating a solid fibrous type material commonly referred to as a "whisker". The whisker has a diameter less than 5 microns and a length less than 100 microns, with a length to diameter ratio of at least 3. Typically the whisker, in an amount of about 5 to about 50% basis final solid content, is incorporated in a catalyst when the mixture is in a highly hydrous or gelatinous condition, and the resulting mixture then dried. The additive material is not removed from the final catalytic product.

PRACTICE OF INVENTION

In the practice of my invention a calcium sulfate fiber was used as a typical whisker material. Other whisker type fibers, such as sapphire, boron nitride, elemental boron, or potassium titanate, are known and could be used equally as effectively. These fibers, however, are very expensive and probably are not practical for use as catalyst additives. Calcium sulfate, on the other hand, is a readily available raw material, is low in cost, and can be converted into a whisker form by a relatively simple process. The calcium sulfate whisker was prepared according to U.S. Pat. No. 3,822,340. The whisker had a diameter of about 2 microns and a length of about 80 microns. The fiber before use is calcined at an elevated temperature to stabilize its chemical and physical properties. The calcium sulfate is in the anhydrite form. It contains no water of crystallization, nor does it rehydrate on reimmersion in any aqueous solution. Likewise, the calcination prevents any reversion of the fiber to a granular form. In view of its inert nature, its effect on increasing the porosity of catalysts is very probably a physical size and shape effect.

In one embodiment of my invention the calcium sulfate whisker was incorporated in an alumina gel as described in the examples below.

EXAMPLE A-2

1800 cc of alumina gel slurry, prepared to give a low surface area and a high pore diameter, and containing a total solids content of 16%, was filtered on a Buchner funnel, washed with 3 liters of water, and dried at 1000° F.

EXAMPLE A-3

Same as Example A-2 except that 20.6 grams of calcium sulfate whisker, equivalent to about 20% basis alumina, was added.

EXAMPLE A-4

Same as Example A-2 except that 10.3 grams of calcium sulfate whisker, equivalent to about 10% basis alumina, was added.

EXAMPLE A-1

Same as Example A-2 except that 20.6 grams of reagent grade calcium sulfate powder, equivalent to about 20% basis alumina, was added.

Porosity characteristics of the above alumina base products are given in Table 2.

TABLE 2

| Example No. | A-2 | A-1 | A-4 | A-3 |
|---|---|---|---|---|
| Calcium sulfate additive | | | | |
| Type | none | granular | whisker | whisker |
| % on alumina | none | 20 | 10 | 20 |
| Bulk specific gravity | 0.51 | 0.50 | 0.43 | 0.41 |
| BET Adsorption | | | | |
| Pore volume - cc/gr | 0.31 | 0.36 | 0.45 | 0.47 |
| Area - sq m/gr | 50.4 | 52.8 | 59.2 | 54.0 |
| Pore diameter - A | 246 | 275 | 304 | 348 |
| Mercury Porismeter | | | | |
| Pore Volume - cc/gr | 0.33 | 0.36 | 0.45 | 0.46 |
| Area - sq m/gr | 44.2 | 43.4 | 46.2 | 42.5 |
| Pore diameter - A | 299 | 332 | 390 | 433 |
| Pore volume | | | | |
| % greater than 600A | 15 | 14 | 22 | 30 |
| % greater than 1000A | 10 | 11 | 16 | 21 |

Surface area and pore volume were determined by both BET nitrogen and mercury porisimeter methods. Pore diameter, expressed as Angstroms, was calculated by the formula "$4 \times 10^4$ times pore volume divided by surface area", which is based on the arbitrary assumption that the pores are cylindrically shaped. Results by the two methods consistently showed the effectiveness of the addition of the calcium sulfate whisker to the alumina sol as a means of increasing the pore volume and pore diameter of the dried alumina gel. The mercury porisimeter tests showed the addition of 20% calcium sulfate whisker increases pore volume from 0.33 to 0.46 cc/gr and the pore diameter from 299 to 433 Angstroms, increases of about 40-45%. The addition of 20% of granular calcium sulfate resulted in small increases in pore volume and pore diameter, but it was estimated that these small increases could have been obtained with only 2 and 4% of the whisker material. The whisker material was therefore 5 to 10 times as effective as the granular shaped material.

Although the addition of the whisker material increased markedly the pore volume and pore diameter of the alumina, it was noted that there was no significant change in the surface area of the alumina. As shown previously in Table 1, precipitation and aging techniques result in a loss in surface area as pore diameter and volume is increased. The lack of a significant surface area loss is an advantage for the use of whisker material in this invention as a means of increasing base pore volume and diameter.

Another advantage for the addition of whisker type material is the increase in macro pore volume. Whereas the addition of 20% granular material showed no significant effect on the volume of pores greater than 600 or 1000 Angstroms, the addition of 20% of the whisker material increased two fold the amount of macro pores in the alumina.

The preparation of catalysts with the aluminas formed as above is well known to those skilled in the art. It is common practice in the preparation of such catalysts to first prepare the alumina base and to then activate the alumina with the metal compounds necessary to carry out a specific chemical reaction. The metal activators are added to the washed alumina either before or after the alumina is dried. A catalyst for the reforming of petroleum naphtha to high octane gasoline can be readily produced by the addition of 0.3-0.6 wt% platinum to the alumina. A hydrogenation catalyst is obtained by the addition of 15-25% nickel as the oxide to the alumina. A catalyst for desulfurization of petroleum fractions can be produced by the addition of 3-5 wt% nickel or cobalt and 10-15 wt% molybdenum as the oxides to the alumina. In all cases, the gelation of the alumina and the addition of the whisker material, for example, will establish the necessary physical characteristics of the base so that the metals activators can effectively carry out their catalytic function.

In another embodiment of my invention the whisker material was incorporated in a semi-synthetic cracking catalyst as described below. The semi-synthetic material contained silica and alumina gel and a hydrated clay.

EXAMPLE B-1

A washed semi-synthetic cracking catalyst filter cake containing 16.1% solids and in the amount of 310.9 grams was diluted with 403 grams of water to give a gel slurry containing 7% solids. Calcium sulfate whisker in the amount of 17.8 grams, equivalent to about 36% basis the catalyst, was added to the gel slurry, The mixture was well stirred, filtered, and dried.

EXAMPLE B-2

Same as Example B-1 except that 35.6 grams of calcium sulfate whisker, equivalent to about 71% basis the catalyst, was added to the gel slurry.

EXAMPLE B-3

Same as Example B-1 except that the calcium sulfate added was a reagent grade granular powder rather than a whisker.

EXAMPLE B-4

Same as Example B-1 except that no calcium sulfate was added to the gel slurry.

Bulk density measurements of the various cracking catalyst samples are given in Table 3.

TABLE 3

| | Cracking Catalyst Samples | | | |
|---|---|---|---|---|
| Example No. | B-4 | B-1 | B-2 | B-3 |
| Calcium Sulfate additive | | | | |
| Type | none | whisker | whisker | granular |
| % basis catalyst | none | 36 | 71 | 71 |
| Bulk specific gravity | 0.39 | 0.25 | 0.22 | 0.37 |

The bulk density of the cracking catalyst was decreased only slightly on the addition of the calcium sulfate in a granular powder form. The addition of the calcium sulfate in a whisker form, however, had a significant effect on the porosity of the catalyst, the bulk specific gravity decreasing from 0.39 to as low as 0.22.

The materials prepared above are readily usuable as catalysts for the cracking of petroleum oils to high octane gasoline. The activity of these specific catalysts could be enhanced by the addition of active zeolites to the silica-alumina mix. The powders could be extruded and used in moving bed cracking processes, or could be ground and used in fluid cracking processes. In the latter case it would be more desirable after the addition of the whisker and the active zeolites to spray dry the slurry into microspheriodal particles of the desired final size.

It is apparent from the above two series of examples that the addition of calcium sulfate whisker type material has a significant effect on increasing the pore volume and diameter of the dried gel type materials. An explanation for this behavior is not readily apparent, particularly in view of the fact that the fiber material is not removed from the catalyst to create this increased porosity. Since the calcium sulfate is relatively inert material, it is probable that this is a result of a physical rather than a chemical effect on the gel material. The behavior of the whisker material in creating increased porosity may be attributable to its packing characteristics. The calcium sulfate fiber has a freely settled density of only about 7 lb/cf, compared to about 35 lb/cf for the calcium sulfate in a granular powder form. It is thus possible that the low density fiber structure prevents the collapse of the gel slurry into a more dense less porous material. In view of this possible physical effect, other whisker type materials should be equally as effective. The whisker should have a diameter less than about 5 microns, a length less than about 100 microns, with a length to diameter ratio of at least 3.

The effect of the whisker fiber in increasing the porosity of both the dried alumina gel and the dried silica-alumina cracking catalyst indicates that the whisker fibers should be effective in increasing the porosity of all precipitate or gel like materials such as alumina, silica, silica-alumina, zirconia, silica-zirconia, magnesia, silica-magnesia, titania, acid treated clay, zeolite containing materials, and the like. Also the whisker fibers should be effective in increasing the porosity of clay like materials which have the property of swelling or hydrating when slurried in aqueous solutions.

It will be seen from the above examples that the whisker material can be introduced in the preparation of materials of a catalytic nature by incorporating the whisker into the gel phase before drying. In catalytic materials which during preparation have an aqueous phase, the whisker material can be incorporated while the catalyst mix is in the aqueous phase, before drying, with similar advantageous results.

Materials prepared according to the present invention possess numerous outstanding advantages and have a wide field of utility. They would be useful in a variety of hydrocarbon conversion reactions such as dehydrogenation, hydrogenation, hydrogenolysis, cracking, hydrocracking, isomerization, oxidation, aromatization, cyclization, hydrodesulfurization, hydrocarbon synthesis, alkylation, polymerization, and hydrogen exchange systems. Catalysts prepared according to this invention are particularly effective in diffusion controlled reactions or in applications where metal or other contaminants deposit on the c catalyst surface. An example of a catalyst application for a reaction susceptible to diffusion control would be a highly active zeolite containing cracking catalyst. An example of a catalyst application where metals are deposited on the catalyst surface affecting the life of the catalyst would be cobaltmolybdenum or nickel-molybdenum catalysts used for desulfurization of petroleum residua to obtain low sulfur fuel oil or used for demetalization to obtain a usuable feed for catalytic cracking of the residua to desirable motor gasoline and other more desirable lower boiling products.

I claim:

1. A method of increasing the BET micro pore volume and pore diameter of a catalytic material prepared from an inorganic oxide gel by incorporating into the catalyst mix, before drying and without subsequent removal, a calcium sulfate whisker fiber having a diameter less than about 5 microns, a length less than about 100 microns, and having a length to diameter ratio of at least about 3.

2. Method of claim 1 in which the amount of whisker fiber in the final catalyst is between 5 and 50%.

3. Method of claim 1 in which the whisker fiber is calcium sulfate anhydrite.

4. Method of claim 1 in which the whisker fiber is calcium sulfate hemihydrate.

5. Method of claim 1 in which the catalytic material contains a hydrous alumina.

6. Method of claim 1 in which the catalytic material contains a hydrous silica.

7. Method of claim 1 in which the catalytic material contains hydrous silica and alumina.

8. Method of claim 1 in which the catalytic material contains hydrous alumina and is activated with cobalt and molybdenum.

9. Method of claim 1 in which the catalytic material contains hydrous alumina and is activated with nickel and molybdenum.

10. Method of claim 1 in which the catalytic material contains hydrous alumina and is activated with zeolites to produce a catalytic cracking material.

11. Method of claim 1 in which the catalytic material contains hydrous silica and is activated with zeolites to produce a catalytic cracking material.

12. Method of claim 1 in which the catalytic material contains hydrous silica and alumina and is activated with zeolites to produce a catalytic cracking material.

13. A catalytic material of increased BET micro pore volume and pore diameter produced by the process of claim 1.